United States Patent
Pececnik

(10) Patent No.: US 10,254,827 B2
(45) Date of Patent: Apr. 9, 2019

(54) ELECTRONIC GAMING MACHINE IN COMMUNICATIVE CONTROL WITH AVATAR DISPLAY FROM MOTION-CAPTURE SYSTEM

(71) Applicant: Interblock d.d., Menges (SI)

(72) Inventor: Joze Pececnik, Kamnik (SI)

(73) Assignee: Interblock d.d., Menges (SI)

( * ) Notice: Subject to any disclaimer, the term of this patent is extended or adjusted under 35 U.S.C. 154(b) by 0 days.

(21) Appl. No.: 15/992,103

(22) Filed: May 29, 2018

(65) Prior Publication Data
US 2018/0292892 A1 Oct. 11, 2018

Related U.S. Application Data

(63) Continuation of application No. 14/867,189, filed on Sep. 28, 2015, now Pat. No. 10,007,332.

(51) Int. Cl.
| | |
|---|---|
| *A63F 13/213* | (2014.01) |
| *G06F 3/01* | (2006.01) |
| *G07F 17/32* | (2006.01) |
| *G06F 3/00* | (2006.01) |
| *H04N 13/366* | (2018.01) |

(52) U.S. Cl.
CPC .............. *G06F 3/011* (2013.01); *G06F 3/005* (2013.01); *G07F 17/3206* (2013.01); *G07F 17/3223* (2013.01); *G07F 17/3269* (2013.01); *G07F 17/3272* (2013.01); *H04N 13/366* (2018.05)

(58) Field of Classification Search
CPC ....... G06F 3/011; G06F 3/005; H04N 13/366; G07F 17/3206; G07F 17/3223; G07F 17/3269; G07F 17/3272

USPC .......................................................... 463/22
See application file for complete search history.

(56) References Cited

U.S. PATENT DOCUMENTS

| | | |
|---|---|---|
| 7,070,571 B2 | 7/2006 | Kramer et al. |
| 8,170,239 B2 | 5/2012 | Bailey et al. |
| 8,734,260 B2 | 5/2014 | Pececnik |
| 2003/0083596 A1 | 5/2003 | Kramer et al. |
| 2005/0239546 A1 | 10/2005 | Hedrick et al. |
| 2006/0135243 A1 | 6/2006 | Englman et al. |
| 2008/0001951 A1 | 1/2008 | Marks et al. |
| 2008/0158232 A1 | 7/2008 | Shuster et al. |
| 2008/0260184 A1 | 10/2008 | Bailey et al. |
| 2009/0082095 A1 | 3/2009 | Walker et al. |
| 2009/0164131 A1 | 6/2009 | Jung et al. |
| 2011/0034238 A1 | 2/2011 | Phillips et al. |
| 2012/0122574 A1 | 5/2012 | Fitzpatrick et al. |
| 2013/0040783 A1 | 2/2013 | Duda et al. |

(Continued)

*Primary Examiner* — Allen Chan
(74) *Attorney, Agent, or Firm* — BakerHostetler

(57) ABSTRACT

A gaming system provides player adjusted entertainment content through:
a) multiple player input terminals having player input controls in communication with a gaming processor and a display screen; b) a library of motion images or a motion capture suit in communication with a display processor. The display processor is in communication with a community display system viewable from all of the multiple number of player input terminals in communication with the gaming processor. The gaming processor is configured to execute software to accept and resolve wagers from the player input terminals and the player input terminal is in communication with the display processor and a controller for the library and/or motion capture suit such that command input can be conveyed to the controller for the motion capture suit.

17 Claims, 4 Drawing Sheets

(56) References Cited

U.S. PATENT DOCUMENTS

| | | |
|---|---|---|
| 2013/0071584 A1 | 3/2013 | Bell |
| 2013/0128022 A1 | 5/2013 | Bose et al. |
| 2013/0252691 A1 | 9/2013 | Alexopoulos |
| 2014/0206442 A1 | 7/2014 | Hollander et al. |
| 2014/0378194 A1 | 12/2014 | Bentley et al. |
| 2015/0126826 A1 | 5/2015 | Kaleal et al. |
| 2015/0149104 A1 | 5/2015 | Baker et al. |
| 2015/0254892 A1 | 9/2015 | Smith et al. |

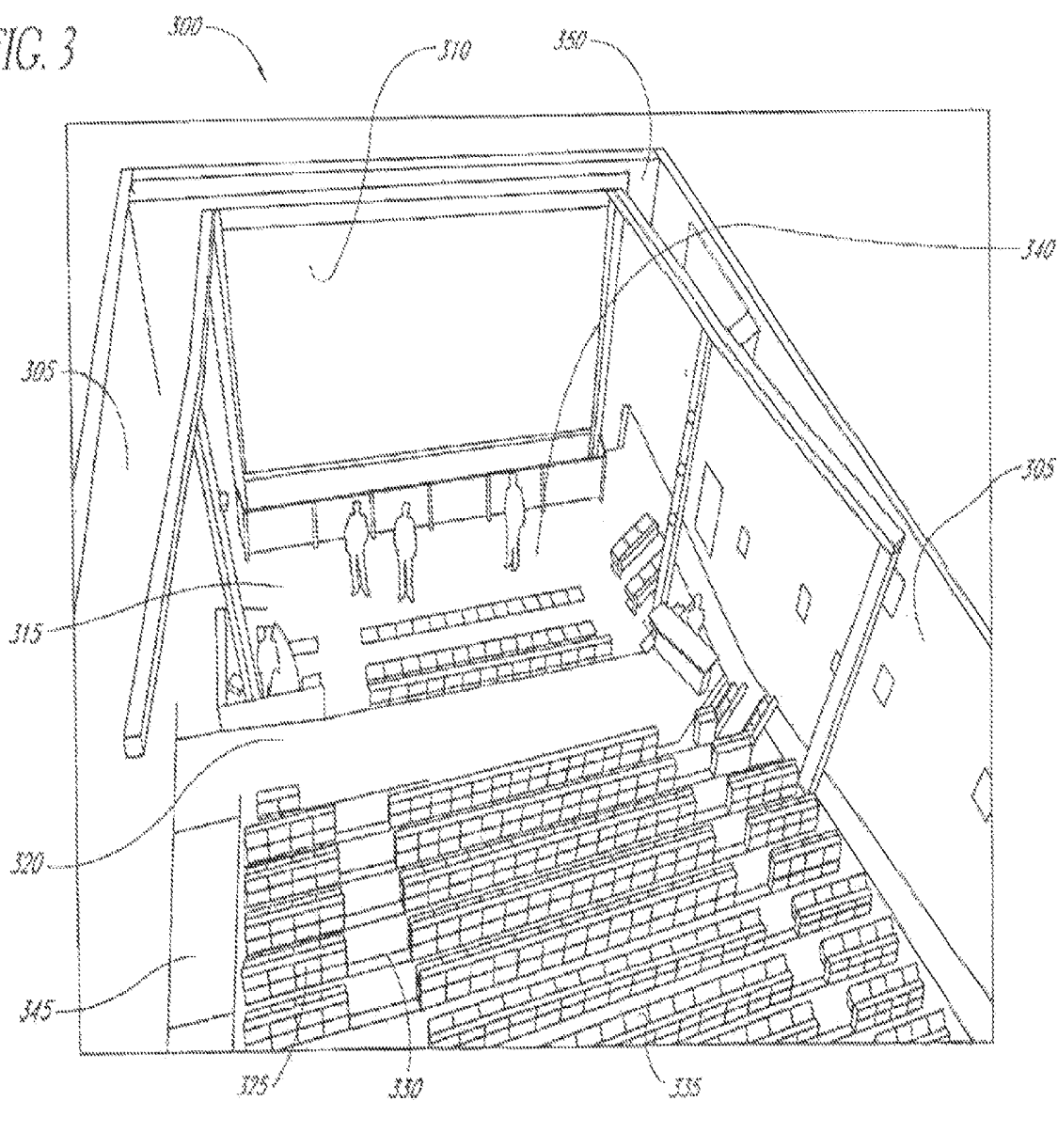

ELECTRONIC GAMING MACHINE IN COMMUNICATIVE CONTROL WITH AVATAR DISPLAY FROM MOTION-CAPTURE SYSTEM

CROSS REFERENCE TO RELATED APPLICATIONS

This application is a continuation of U.S. patent application Ser. No. 14/867,189, filed Sep. 28, 2015, the contents of which is incorporated herein by reference in its entirety

1. FIELD OF THE INVENTION

The present invention relates to the field of gaming, electronic gaming with associated distal entertainment, and distal entertainment that is influenced by command or selection at an electronic gaming system.

2. BACKGROUND OF THE ART

The gaming industry has realized over the years that although players enjoy gaining as entertainment in its own right, the addition of ancillary entertainment value increases player time and enjoyment for the player. It is desirable to find additional ways of providing entertainment in which the player exercises some level of control over the tenor or content of the entertainment.

A growing market has developed for tools and systems that track humans and other bodies at rest and in motion. The applications for such systems vary considerably, and include such areas as the creation of computer-generated and graphical animations for entertainment, the analysis of human-computer interaction, the assessment of performance athletics and other biomechanics activities, and the evaluation of workplace and other activities for general ergonomic fitness.

The possible sample uses for a body-tracking system are quite varied. For example, a user interested in creating a realistic computer animation of a gymnast might be interested in tracking the full-body movements of the gymnast during a brief tumbling run characterized by high-velocity, high-acceleration activity. A second sample user might instead be interested in measuring the upper-body movements of a typical clerical worker over a full workday, in order to assess the role of various activities in causing repetitive stress injury. A third sample user might wish to record the motions of a high-performance skier or snowboarder over a mile-long section of mountain in order to study and possibly improve his or her technique.

The most general functional requirement of a body-tracking (or motion-capture) device is that it accurately and reliably measure and report the configuration of the various articulating members (limbs) of the body over a particular duration of interest. In order to be most useful, however, a motion-capture device must also satisfy additional criteria. It must be sufficiently lightweight and unencumbering to allow the free performance of the activity being measured, (A system that prevents an athlete or, performer such as a dancer from acting naturally, either due to the addition of weight, to an impeding of balance and flexibility, or to the presence of other physical constraints is clearly of lessened utility as a motion-capture device). It must also allow for a performance space appropriate to the motion being measured, i.e., it must allow the user the freedom to move through space as needed to complete the activity being measured.

Various contributions to the prior art have addressed themselves to the general problem of motion capture. Electromagnetic (E/M) tracking systems use multiple elements consisting of three orthogonally wound coils. At least one such element is designated as a transmitter, and at least one such element is designated as a receiver. By energizing, in turn, the coils in a transmitter element, and measuring the signal induced in the receiver elements(s), the relative position of the transmitter and receiver element(s) can be calculated. Such E/M tracking systems are sensitive to the presence of metal in the close surroundings and, in addition, have a workspace limited by the requirement that the receiver(s) remain within several feet of their corresponding transmitter. Another disadvantage of E/M technology is that it typically includes lag time which renders the position data non-real time.

As with E/M position sensing technology, ultrasonic (US) and infrared (IR) position sensing technologies do not require a direct tether between the hand and monitor. US and IR technologies have the disadvantage, however, that they both require direct line of sight. Thus, when one hand passes in front of the other, the position signal can be lost. Additionally, US technology, in particular, is very sensitive to ambient acoustic noise. Both technologies can introduce lag time, again rendering the position data non-real time.

Another example of a prior art solution to the problem of motion capture is a passive, optically-based body-tracking system, such as that produced by Motion Analysis. In such a system, multiple reflective markers are attached to the surface of the limbs of interest, such that these markers are placed on either side of the articulating joints. Multiple cameras record the positions of these markers over time, and this marker position data is used to extract (via "inverse kinematics") the corresponding configurations of the various limbs and joints of interest. Such optical tracking systems have an inherent workspace limitation that comes from the need to use cameras, namely that the user of the system is limited to the relatively small workspace that is both visible to the cameras and in focus. Tracking problems occur when markers become occluded, since data cannot be recorded. In addition, such a system requires a non-trivial amount of post-processing of the data; while it is expected that computing power and cost efficiency will continue to increase, optical systems still do not deliver on-the-spot, "real-time" data.

Still another example of a prior art solution is an active, optically-based body-tracking system. Such a system is conceptually similar to the passive system described above, but with several differences. The markers in such a system typically actively emit light, instead of being simple, passive reflectors. This allows the controlling software to energize each of the markers in turn, and if properly synchronized with the computer doing the data analysis, can help prevent problems that occur when the control software loses track of "which marker is which." Otherwise, the workspace, marker-occlusion, and post-processing shortcomings of such active optical systems are similar to that of the passive ones.

Camera-based technology called Mandela to monitor human motion without requiring the user to wear any special devices. The system, however, only tracks body movements in two dimensions (2D). Most motion capture (MC) systems require the user to wear some form of element that either is a sensor itself or is one component of a sensing system where other components are located off the user.

Among technologies used to generate motion capture images, either directly or in the formation of avatars displayed on a screen are the following, which are incorporated herein by reference in their entireties as enabling background for providing methods, systems, components and apparatus for providing and displaying images, including avatars upon distal control.

Published US Patent Application Document 20030083596 (Kramer) discloses a goniometer-based body-tracking device and method).

Published US Patent Application Document 20080260184 (Bailey) discloses a virtual recording studio is formed based on information from a number of different locations. One instrument may be located locally, and other instruments may be located remotely, for example accessible over the Internet. The remote instruments may be combined with outputs from other instruments, to create a virtual recording studio where parts of it are available over the Internet. An electronic music component may also be used.

Published US Patent Application Document 20130040783 (Duda) discloses systems and methods using an exoskeleton suit for providing resistance to movement of a wearer. The system includes a plurality of wearable actuators, a plurality of wearable sensors, and a processor. Each of the wearable sensors measures an indication of an orientation of a corresponding one of the wearable actuators with respect to a vertical direction. Each of the sensors also measures an indication of a motion experienced by the corresponding one of the wearable actuators.

Published US Patent Application Document 20130071584 (Bell) describes the design of an articulated artificial skin that may be used to cover any three dimensional surface that changes morphology with time. In one embodiment the skin is made from individual four sided pyramids arranged to bend about their edges. Each pyramid may contain a solid, liquid, gas, or plasma, or any relevant technology such as solar panels and rechargeable batteries. Each pyramid may be connected to neighboring pyramids via tubes, pipes, or electrical wires to allow the flow of fluids and/or electricity. Multi layers of the artificial skin may be used to provide features such as pressure garments, cooling garments, thermal barriers, and armor shielding suitable for use in extreme environments.

Published US Patent Application Document 20150254892 (Smith) discloses systems, methods, apparatuses, and computer readable medium are provided that cause a two dimensional image to appear three dimensional and also create a dynamic or animated illustrated images. The systems, methods, apparatuses and computer readable mediums implement displacement maps in a number of novel ways in conjunction with among other software, facial feature recognition software to recognize the areas of the face and allow the users to then customize those areas that are recognized. Furthermore, the created displacement maps are used to create all of the dynamic effects of an image in motion.

Published US Patent Application Document 20150149104 (Baker discloses a system of sensors including 1) an accelerometer, 2) a magnetometer, and 3) a gyroscope, combined with a zero crossing error correction algorithm, as well as a method of using those sensors with the zero crossing error correction algorithm, for orientation motion tracking applications, including sports and athletics training, animation for motion picture and computer gaining industry, 3D joysticks, and peripherals for computer gaining industry, as well as medical and health diagnosis and monitoring systems.

Published US Patent Application Document 20150126826 (Kaleal) discloses systems and methods that facilitate providing guidance to a user during performance of a program or routine using a personalized avatar. A system includes a reception component configured to receive physiological and movement information about a user during performance of a routine or program, and an analysis component configured to analyze the physiological and movement information based on reference physiological and movement metrics for the routine or the program to determine whether, how and to what degree the user deviates from requirements of the routine or the program. The system further includes a reaction component configured to determine a response for an avatar displayed to the user based on a determination regarding whether, how and to what degree the user deviates from the requirements of the routine or the program, and an avatar control component configured to initiate manifestation of the response by the avatar as displayed to the user.

Published US Patent Application Document 20140378194 (Bentley) discloses a broadcasting method for broadcasting images with augmented motion data, which may utilize a system having at least one camera, a computer and a wireless communication interface. The system obtains data from motion capture elements, analyzes data and optionally stores data in database for use in broadcasting applications, virtual reality applications and/or data mining. The system also recognizes at least one motion capture data element associated with a user or piece of equipment, and receives data associated with the motion capture element via the wireless communication interface. The system also enables unique displays associated with the user, such as 3D overlays onto images of the user to visually depict the captured motion data. Ratings, compliance, ball flight path data can be calculated and displayed, for example on a map or timeline or both. Furthermore, the system enables performance related equipment fitting and purchase.

Published US Patent Application Document 20120122574 (Fitzpatrick) discloses a system and method for utilizing motion capture data for healthcare compliance, sporting, gaming, military, virtual reality, industrial, retail loss tracking, security, baby and elderly monitoring and other applications for example obtained from a motion capture element and relayed to a database via a mobile phone. System obtains data from motion capture elements, analyzes data and stores data in database for use in these applications and/or data mining, which may be charged for. Enables unique displays associated with the user, such as 3D overlays onto images of the user to visually depict the captured motion data. Ratings, compliance, ball flight path data can be calculated and displayed, for example on a map or timeline or both. This enables performance related equipment fitting and purchase, includes active and passive identifier capabilities.

Published US Patent Application Document 20130128022 (Bose) discloses an intelligent motion capture element that includes sensor personalities that optimize the sensor for specific movements and/or pieces of equipment and/or clothing and may be retrofitted onto existing equipment or interchanged therebetween and automatically detected for example to switch personalities. This may be used for low power applications and accurate data capture for use in healthcare compliance, sporting, gaming, military, virtual reality, industrial, retail loss tracking, security, baby and elderly monitoring and other applications for example obtained from a motion capture element and relayed to a database via a mobile phone. System obtains data from motion capture elements, analyzes data and stores data in database for use in these applications and/or data mining. This enables unique displays associated with the user, such as 3D overlays onto images of the user to visually depict the captured motion data. Enables performance related equipment fitting and purchase. Includes active and passive identifier capabilities.

Published US Patent Application Document 20080001951 (Marks) describes embodiments for improving and enhancing verbal and non-verbal communications during or in conjunction with game play. The system improves and enhances verbal and non-verbal communication by modifying avatars representing real-world players based on real-world reactions to gameplay events. The effect can take on many forms, such as video pixel patches that can be integrated into specific portions of an avatar. The video pixel patches are preferably applied in such a way that they integrate into the moving video frames, and therefore, the integration appears to be substantially done in real-time.

20080158232 (Shuster) discloses a computer system that is used to host a virtual reality universe process in which multiple avatars are independently controlled in response to client input. The host provides coordinated motion information for defining coordinated movement between designated portions of multiple avatars, and an application responsive to detect conditions triggering a coordinated movement sequence between two or more avatars. During coordinated movement, user commands for controlling avatar movement may be in part used normally and in part ignored or otherwise processed to cause the involved avatars to respond in part to respective client input and in part to predefined coordinated movement information. Thus, users may be assisted with executing coordinated movement between multiple avatars.

As described herein, these imaging systems can be combined with electronic gaming tables, electronic gaming tables and any other electronic player input controls or terminals, with the player positions for these input controls in view of the imaging systems.

SUMMARY OF THE INVENTION

A gaming system provides player adjusted entertainment content through:
a) multiple player input terminals having player input controls in communication with a gaming processor and a display screen; b) a library of motion images or a motion capture suit in communication with a display/entertainment processor. The display processor is in communication with a community display system viewable from all of the multiple number of player input terminals in communication with the gaming processor. The gaming processor is configured to execute software to accept and resolve wagers from the player input terminals and the player input terminal is in communication with the display processor and a controller for the library and/or motion capture suit such that command input can be conveyed to the controller for the motion capture suit.

BRIEF DESCRIPTION OF THE FIGURES

FIG. 3 is a perspective overview of an example of an enclosed theater system with seating for engaging in three-dimensional systems according to the present technology.

DETAILED DESCRIPTION OF THE INVENTION

Figures 1A, 1B:
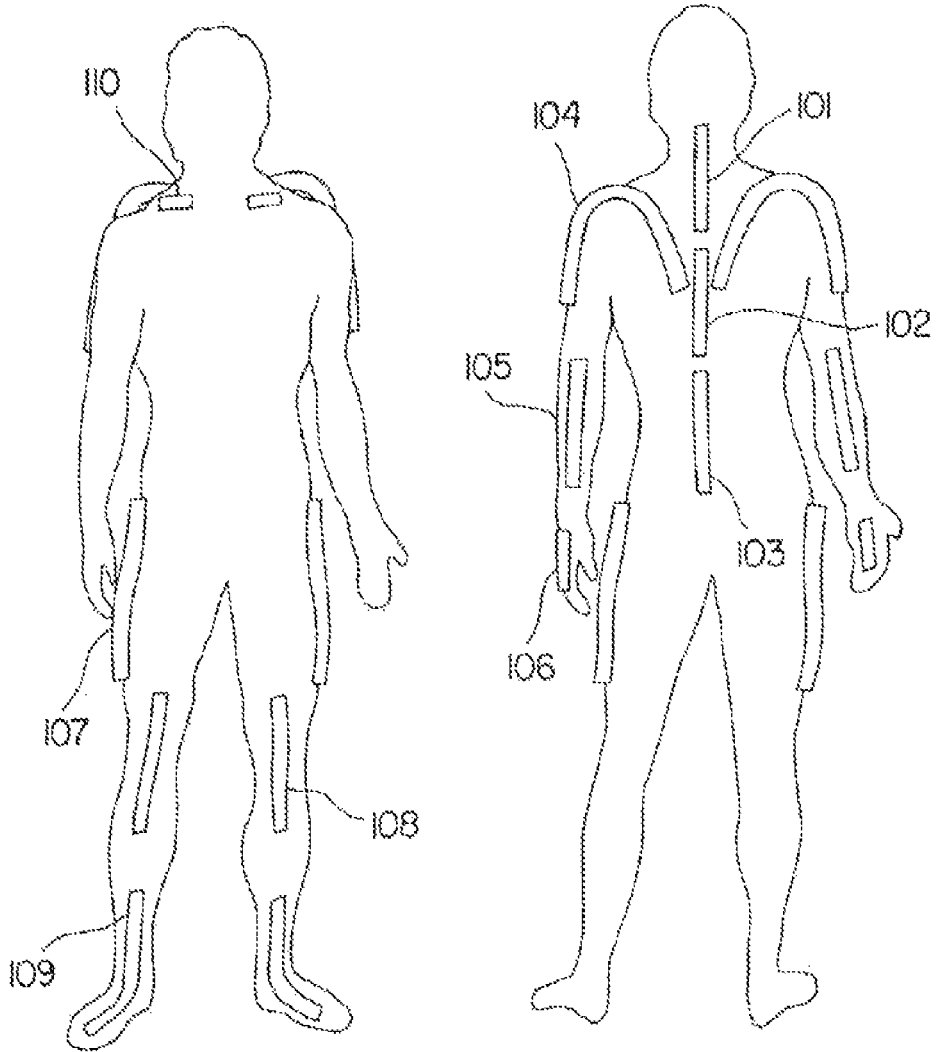
FIG. 1A shows an exemplary arrangement for placing sensor assemblies on a human body.
FIG. 1B shows an exemplary arrangement for placing sensor assemblies on a human body.

A gaming system provides player adjusted entertainment content through:
a) multiple player input terminals having player input controls in communication with a gaming processor and a display screen. The player input controls may be on electronic gaming machines such as video slots, electronic gaming tables with terminals (as in playing card wagering event tables, craps tables, roulette tables, big wheel tables, and the like). There may be a library of motion images (e.g., dances, acrobatics, singing, athletics, choreographed scenes, or preferably a motion capture system (e.g., a motion-capture suit) in communication with a broad area display processor. By "broad area" it is meant that the image on the display system may be viewable by multiple players at the multiple player input controls, whether at a single bank of terminals or in an arena setting, even with multiple different wagering formats (video machines, gaming tables, hand-held wagering devices, and the like) are available and interact with the visual display processor. The display processor is in communication with a community display system viewable from the multiple number of player input terminals in communication with the gaming processor (preferably all of the input terminals). The gaming processor is configured to execute software to accept and resolve wagers from the player input terminals and the player input terminal is in communication with the display processor and a controller for the library and/or motion capture suit such that command input can be conveyed to the controller for the motion capture suit.

The system may operate in many different modes and formats and enable a wide range of interactions with the player terminals. In its preferred mode, unlike U.S. Pat. No. 8,734,260, the visual content does not require and may be completely absent of imagery relating to wagering outcome events, wagering outcome determining game elements, and random event generators. The present system therefore can be configured to provide entertainment imagery, which excludes game content/game outcome imagery.

The basic system is described above, with the basic multiple components of the multiple player input terminals, the gaming processor, the imaging processor and the community image display system. It is possible for a single processor to act as both the gaming processor and the imaging processor, but this is not preferred, especially in view of the additional complexity that would be needed in obtaining jurisdictional gaining authority approval on such a blended processing system.

One mode of operation of the system is for the individual wagering terminals or player positions are engaged in an underlying wagering event, with wagers (antes, play wagers, side bets, jackpot wagers, progressive wagers, and all other forms of wagers available in an underlying gaming event), and a game processor or game processor in combination with physical random events determines wagering event outcomes (random events, pseudo-random events, partially skill-based events) determines outcomes and resolves the wagers based on the outcomes. Essentially any wagering event in which there is electronic input capability and, preferably, a central gaining processor can be used in this technology.

The player position input system is also provided (with a separate panel, a separate region or screen area on a touchscreen panel, buttons, joystick, voice data entry, or combinations thereof) with capability of data entry outside the scope of actual gaming/wagering input, and related to the entertainment function described herein.

The non-wagering event player position input controls are directed towards at least menu selection of entertainment content. As libraries of each of fully animated events, libraries of overlays from underlying motion-captured activity provided and libraries of overlain images onto a base image or avatar should be provided, the entertainment content may include costumes, make-up, hairstyles, ink (tattoos), character dimensions e.g., size, shape, weight, height, ethnic features, etc.), level of competency (e.g., athleticism, dance skill level, acrobatic capability), degrees of dress or undress, and other ranges of features that can be shown in the display. Musical capability (e.g., voice, style, instrument play, etc.) may also be part of the menu. When an individual at a gaining input terminal is provided with access to control of input to the entertainment menu (either randomly, by payment, or by gaming success, or weighted gaming success, or casino input control from a central station), the individual (or even groups) player can enter entertainment selection from the menu and transmit it to the appropriate recipient through the entertainment processor.

The player may preset controls, either to a specific desired entertainment content, so that upon receiving notice of capability of entering entertainment selection input, a single data entry (touchscreen pressure, button, toggle, voice command, handle pull, or the like) can be performed. A narrowed range of options could also be provided, with greater detail added, such as selecting modern dance as a general category, and then upon authorization, selecting costumes and dance styles from CATS, or Rock of Ages. Les Miserables, and the like. Or, the generic category could be rhythm and blues, and the selections could be among music and styles of Tina Turner, Michael Jackson, The Supremes, or the Temptations, and the like. Classic Las Vegas-style costuming such as that for burlesque or impersonators could also be provided. The player inputs selections (e.g., music, style, speed, athleticism, costumes, and the like), and those selections (to the degree possible and available) are then displayed on the common screen. One unique attribute is the provision of a more flexible live theater that does not need the extensive library of a fully prerecorded menu. The live theater would provide a live performer actor/dancer/musician that is not in contact proximity with players, and the live performer would have a motion-capture capability (e.g., clothing, suit, pack, applique's, patches, piezoelectric patches, camera-trackable fiducials, and the like), and the performer would respond to the player input to perform according to a selected style.

The gaming system may be enabled and configured (through both the game processor and the entertainment processor with priority of sending commands to the display processor and/or controller is determined by the gaming processor. This determination may be weighted, random, or even based on specific game outcomes (e.g., a payout of at least 50 times on a video reel slot, at least a full house in video poker, consecutive blackjacks in video or table blackjack, three consecutive natural wins in baccarat, and the like), maximum amount wagered over a given period (e.g., the last 5, 10, 15 or 30 minutes), a single large win or jackpot event, and the like.

The player has his input terminal/controls activated (e.g., a flash notice, special lighting, audio output, panel illumination, even a distal spotlight shown on the player position coordinated with electronic notice), and then the player inputs his menu command or suggestion, and the display system responds. The gaming system determination of the priority may be based upon weighting of time of a player at an individual player terminal, total amount of wagering at the individual player terminal and/or total amount of losses incurred at an individual player terminal. The player terminals are able to display available commands for communication to the display processor as with a scrolling menu, keyboard, voice-commands, pictorial/icon display, and the like. The system may provide any type of available commands including musical selections and or styles of movement to be performed by a performer within the motion capture suit.

As previously indicated, the preferred mode of providing visual activity is by having a performer in a motion-capture technology system, having the performer perform, electronically interpreting the movement of the performance, transmitting that electronic performance as a skeletal image or avatar image, and combining that transmitted image with overlay image technology (adding shape, color, clothing, apparel, accoutrements, and other artistic components to the transmitted image) to form a displayable image that is displayed by the imaging system through the entertainment processor onto the communal display screen, which may be two-dimensional, three dimensional (especially holographic). The motion-capture technology may be hard-wired or wireless (preferred), the latter enabling wireless communication with the display processor at a communication rate of at least 60 Hertz, 70 Hertz, 80 Hertz, 100 Hertz or more.

The pure (non-gaming and gaming) imaging technology referenced above may provide the technical enablement for the individual components of the imaging system preferred herein.

FIGS. 1A and 1B (incorporated from Published US Patent Application Document 20030083596) show an exemplary arrangement for placing sensor assemblies on a human body. This configuration instruments most of the major joints on the body, and (combined with devices to measure hand motion, e.g., a CyberGlove® instrumented glove made commercially available by Virtual Technologies, Inc., of Palo Alto. Calif., and a 5.sup.th Glove made commercially available by 5DT Corporation, South Africa) affords body coverage that may, depending on the application, be considered as essentially complete. Sensors assemblies marked with a "(3)" after the name (not to be confused with a drawing reference numeral) measure a full three rotational degrees of freedom. Sensors marked with a "(1)" or a "(2)" are located on joints with less than complete rotational freedom, and are therefore simpler devices. Assemblies include the upper back (3) assembly (101), Middle Back (3) assembly (102), Lower Back (3) assembly (103), Shoulders (3) assembly (104), Shoulder "Shrug" (2) assembly (110), Elbow (1) assembly (105), Forearm and Wrist (3) assembly (106), Hip (3) assembly (107), Knee (1) assembly (108), and Ankle (2) assembly (109). Each of these components or assemblies is disposed proximate or adjacent the associated human body part or parts as illustrated in FIGS. 1A and 1B.

The apparatus measures angles of portions of a human body, said portions comprising at least one of the shoulder and the hip. The apparatus may include: at least one of the following sensing devices: a first sensing device comprising a long resistive bend sensor extending over multiple joints with parallel axes from terminal link to terminal link; and a second sensing device comprising multiple short resistive bend sensors and multiple links and revolute joints and terminating in terminal links, with each sensor measuring one revolute joint angle; for the shoulder, means for securing said sensing device to said human body to measure the angle of the humerus in relation to the torso, whereby one terminal link moves with said humerus and the other terminal link moves with said torso; for the hip, means for securing said sensing device to said human body to measure the angle of the femur in relation to the torso, whereby one terminal link moves with said femur and the other terminal link moves with said torso; a data processor for receiving electrical signals from said sensing devices and determining angles from said signals. The apparatus may also include sensing devices for measuring both said shoulder and said hip, and at least one resistive bend sensor for measuring an elbow, wrist, knee or ankle body part; means for mounting said resistive bend sensor in angle-measuring relation to said elbow, wrist, knee or ankle body part.

The motion-capture measures angles of portions of a human body, said portions comprising at least one of the shoulder and the hip with at least one prismatic sensing device for measuring said angle in relation to at least one of said shoulder and hip; optionally at least one of the following revolute sensing devices: a first sensing device comprising a long resistive bend sensor extending over multiple joints with parallel axes from terminal link to terminal link; and a second sensing device comprising multiple short resistive bend sensors and multiple links and revolute joints and terminating in terminal links, with each sensor measuring one revolute joint angle; at least one resistive bend sensor for measuring an elbow, wrist, knee or ankle body part; means for mounting said resistive bend sensor in angle-measuring relation to said elbow, wrist, knee or ankle body part; for the shoulder, means for securing said sensing device to said human body to measure the angle of the humerus in relation to the torso, whereby one terminal link moves with said humerus and the other terminal link moves with said torso; for the hip, means for securing said sensing device to said human body to measure the angle of the femur in relation to the torso, whereby one terminal link moves with said femur and the other terminal link moves with said torso; a data processor for receiving electrical signals from said sensing devices and sensors and determining angles from said signals. The apparatus for measures the orientation of two body parts having up to three degrees of freedom of orientation and position relative to each other.

Figure 2:
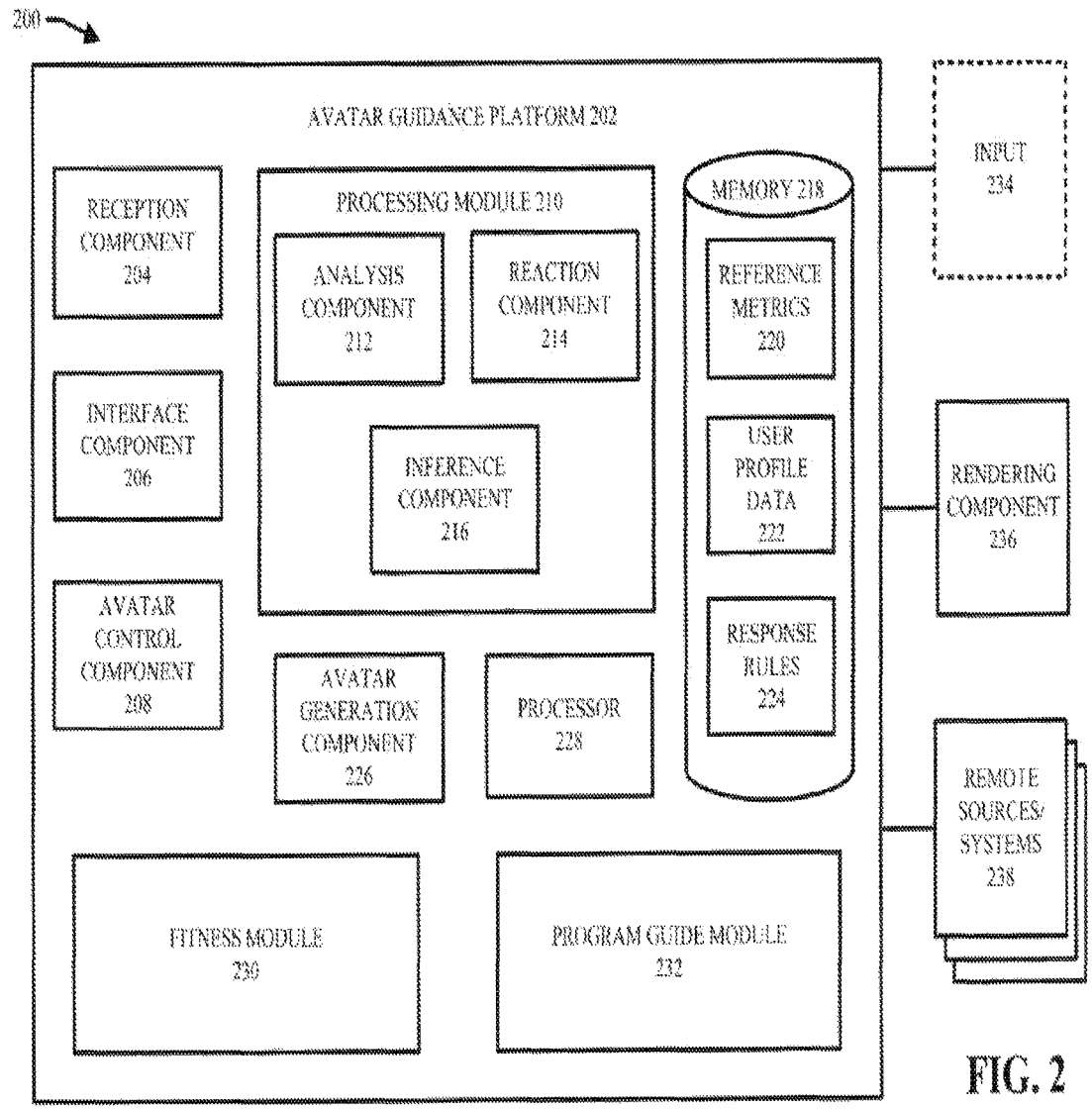
FIG. 2 is a schematic of an avatar guidance platform.

FIG. 2 presents an example avatar guidance system 200 that facilitates guiding or assisting a user with adhering to a program, routine or activity using an avatar in accordance with various aspects and embodiments described herein. System 200 can include same or similar features and functionalities as system 100. In an aspect, system 200 employs the architecture of system 200, including one or more of the various components/devices of system 200, wherein avatar guidance platform 202 corresponds to an avatar platform. Avatar guidance platform 202 can thus include same or similar features and functionalities as an avatar platform. Repetitive description of like elements employed in respective embodiments of systems and interfaces described herein are omitted for sake of brevity.

Avatar guidance system 200 can include avatar guidance platform 202, input 234, rendering component 236 and one or more remote sources/systems 238. Avatar guidance platform 202 is configured to facilitate guiding or assisting a user with adhering to a program, routine or activity using an avatar that is responsive to various input 234 associated with performance of the program, routine or activity. This input 234 can include physiological, motion and/or image data about the user received (e.g., in real-time) during performance of the program, routine or activity.

For example, avatar guidance platform 202 can receive physical and physiological activity data for a user during performance of a fitness routine and compare this physical and physiological activity data to reference physical and physiological activity data for the fitness routine to determine whether the physical and physiological activity data deviates from the reference physical and physiological activity data. In response to a determination that the user is moving too fast or too slow, has a heart rate to high or too low, is incorrectly or correctly performing a fitness movement, etc., avatar guidance platform 202 can determine a response to manifest via an avatar to respond to the deviation or non-deviation. For example, avatar guidance platform 202 can determine an appropriate verbal command or remark for the avatar to speak (e.g., "your heart rate is too low, lets speed it up") and/or a physical appearance/motion for the avatar to effectuate (e.g., the avatar can demonstrate the correct motion, the avatar can express an emotion of gratitude via a facial expressions and body movements, etc.). Avatar guidance platform 202 can then cause an avatar generated and presented to the user via a GUI (or as a hologram) to carry out the response (e.g., speak the command, perform the motion and appearance change, etc.).

In an aspect, the avatar is generated and presented to the user via a rendering component 236 located at a client device. Rendering component 236 can include same or similar features and functionality as a rendering component. Rendering component 236 can include suitable hardware (e.g., a display screen, a hologram generation device, etc.) and software (e.g., software for generating a GUI and/or software for accessing and rendering network based interface, such a browser) to accomplish generating and presenting an avatar that performs the responses determined by avatar guidance platform 202 to facilitate guiding the user with adhering to the program, routine or activity being monitored.

Generally, avatar guidance platform 202 can include memory 218 that stores computer executable components and processor 228 that executes the computer executable components stored in the memory. It is to be appreciated that although avatar guidance platform 202 is illustrated as being a standalone component, such implementation is not so limited. For example, avatar guidance platform 202 can be located at a client device, a remote server (e.g., an avatar server) or e cloud. In another aspect, one or more components of avatar guidance platform 202 can be located at both the client device and the remote server. Still in yet another aspect, the components of avatar guidance platform can be distributed between the client and the server.

Figure 3A:
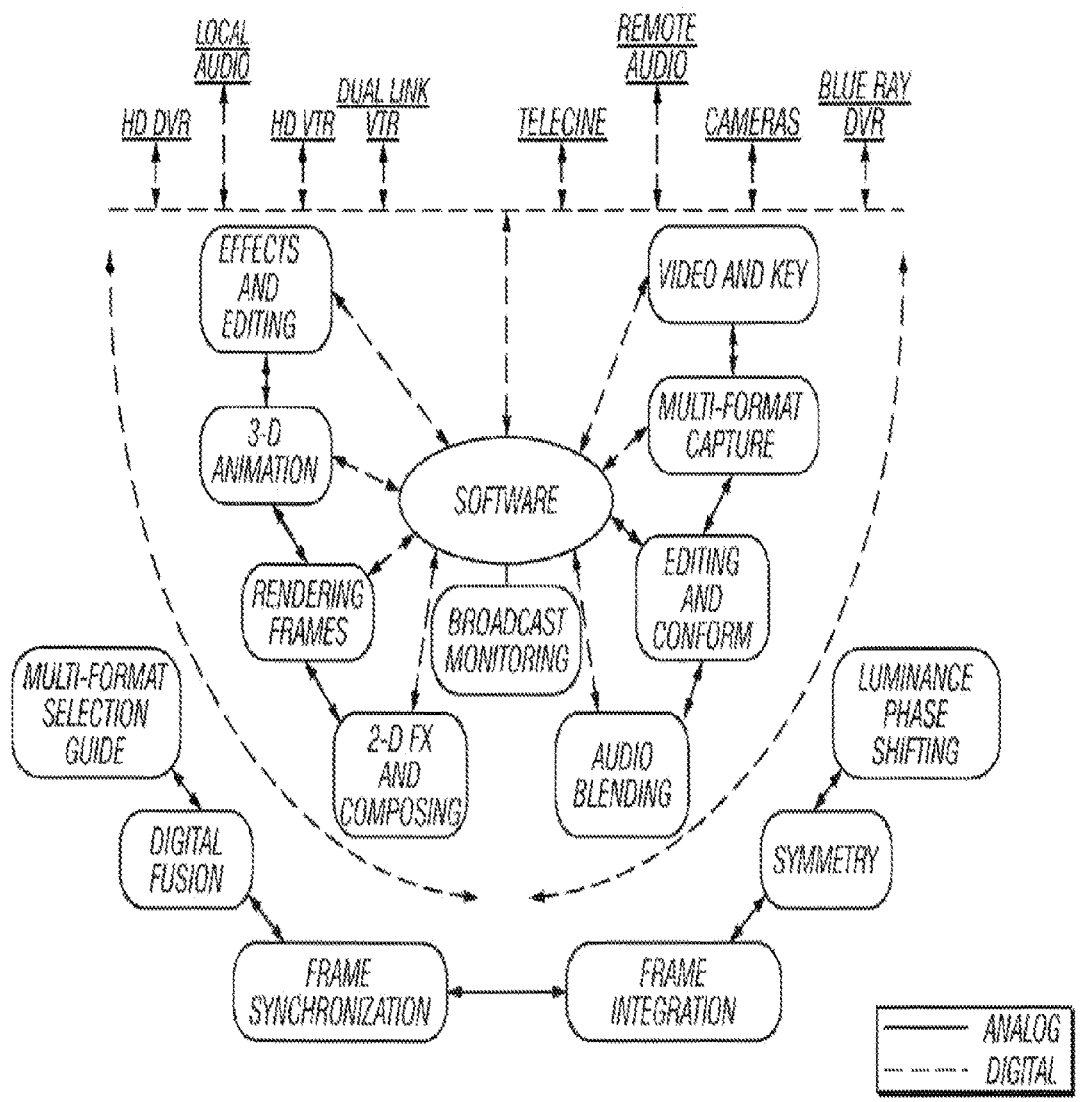
FIG. 3A illustrates a complete block diagram of one embodiments of a system that may be used in the practice of the present technology.

FIG. 3A (incorporated from US Published Application Document No. 20080260184) illustrates a complete block diagram of one embodiments of a system that may be used in the practice of the present technology. An image, video and/or audio can be obtained from a number of different sources; here a high definition DVR, high definition video tape recorder, telecine, cameras, or other similar devices, as well as local audio and remote audio. The computer carries out effects and editing on the information it receives, including carrying out 3-D animation, frame rendering, audio blending, editing, multi-format capturing, and keyframes may also be obtained. All the image parts may be obtained digitally. Analog operations may also include a multiformat selection guide, digital fusion, frame synchronization, frame integration, symmetry editing, and luminance phase shifting. The operation allows video and/or images of an original concert or other music video to be first played. The images and videos can be from a capture card, voice bites, etc.

As previously noted, Published US Patent Application Document No. 20150126826 (Kaleal) discloses systems and methods that facilitate providing guidance to a user during performance of a program or routine using a personalized avatar. A system includes a reception component configured to receive physiological and movement information about a user during performance of a routine or program, and an analysis component configured to analyze the physiological and movement information based on reference physiological and movement metrics for the routine or the program to determine whether, how and to what degree the user deviates from requirements of the routine or the program. The system further includes a reaction component configured to determine a response for an avatar displayed to the user based on a determination regarding whether, how and to what degree the user deviates from the requirements of the routine or the program, and an avatar control component configured to initiate manifestation of the response by the avatar as displayed to the user. The system may include: a memory having stored thereon computer executable components; a processor that executes at least the following computer executable components: a reception component configured to receive, in real-time, first biometric feedback from a first user during performance of a entertainment routine and second biometric feedback from a second user during concurrent performance of the entertainment routine; an analysis component configured to evaluate performance of the entertainment routine by the first user based on analysis of the first biometric feedback and the second biometric feedback; a reaction component configured to determine a reaction for an avatar displayed to the first user based on the analysis; and an avatar control component configured to initiate manifestation of the reaction by the avatar as displayed to the first user during the performance of the entertainment routine. The reception component may be configured to receive the first biometric feedback via a first network device from one or more biometric sensors worn by the first user and the second biometric feedback via a second network device from one or more biometric sensors worn by the second user, and the analysis may include comparison of the first biometric feedback to reference biometric metrics for the entertainment content routine and comparison of the first biometric feedback to the second biometric feedback. The analysis component may be configured to determine whether the first user deviates from requirements of the entertainment routine based on the analysis, and wherein the reaction component is configured to determine a reaction for the avatar that provides instruction regarding correction of a deviation from a requirement of the fitness routine in response to a determination that the first user deviates from the requirement of the fitness routine. In the instance of a failure, the system may default to a stored library of performances that may more clearly reflect the desired visual activity (e.g., in the case of a fall or injury). Individual performers may be available at a single time, so that there may be multiple motion-capture devices available, and performers may alternate performances or series of performances with minimal interruption. The system may be operated so that the reception component is further configured to receive, in real-time, first movement data from the first performer during the performance of the entertainment routine and second movement data from the second performer during the concurrent, transitional or subsequent performance of the entertainment routine, wherein the first and second movement data corresponds to body movement of the first and second performers, respectively, as they perform the routine, the analysis component is configured to evaluate the performance of the entertainment routine by the first performer based on additional analysis of the first movement data and the second movement data, and the reaction component is configured to determine the reaction for the avatar based on the additional analysis. II—System Architecture.

Referring now to the drawings, with reference initially to FIG. 2, presented is a diagram of an example architecture for systems that facilitate manifesting responses to physical and physiological activity data about a user using a virtual avatar in accordance with various aspects and embodiments described herein. System architecture can be employed in association with the disclosed avatar guidance system 200. Aspects of systems, apparatuses or processes explained in this disclosure can constitute machine-executable components embodied within machine(s), e.g., embodied in one or more computer readable mediums (or media) associated with one or more machines. Such components, when executed by the one or more machines, e.g., computer(s), computing device(s), virtual machine(s), etc. can cause the machine(s) to perform the operations described. A system includes a person/performer and a client device, such as a machine, configured to receive and/or capture physical and physiological activity data physiological/biometric data, motion data, image data, etc.) about the performer. In an aspect, one or more sensor devices can be worn or otherwise attached to the performer to capture the physical and physiological activity data and transmit the captured physical and physiological activity data to client device (e.g., in real-time or substantially real time). For example, the one or more sensor devices can include biometric sensors configured to detect information regarding at least one of: heart rate (e.g., via a heart monitor device), body temperature (e.g., via a thermometer), respiration, perspiration, blood pressure, electrical activity of the heart or brain, calories burned, or body fat and body weight. In an aspect, the one or more sensor devices can include implanted medical devices/sensor configured to detect and wirelessly communicate a wide array of biometric information about the user to a client device.

In addition to physiological/biometric data, sensor devices are preferably designed to facilitate capture and reporting of user movement or motion corresponding to speed, direction, and orientation of the user a whole and/or individual body parts of the user. For example, the one or more sensor devices can include motion sensors such as an accelerometer, a gyroscope or an inertial measurement unit (IMU). Thus captured motion data can include information identifying acceleration, rotation/orientation, and/or velocity of the motion sensor device itself, facilitating determination of motion and movement data of the body and/or body parts to which the motion sensor are attached. For example, processing of raw motion data (e.g., by the sensor itself or the device to which the raw motion data is communicated, such as client device and/or avatar server) can include pattern analysis to determine or infer types of motion represented by the motion data and/or characteristics associated with the types of motion (e.g., intensity, duration, range, speed, etc.). For example, using pattern recognition, patterns in the motion data can be correlated to know patterns for different types of motion, such as walking, mining, climbing, dancing, flexing, jumping, falling, turning, etc.

In another aspect, physical and physiological activity data regarding movements/motions performed by user can include information captured by an intelligent fitness device employed by the user in association with performance of an entertainment routine or exercise. For example, some fitness exercises can involve usage of fitness equipment, such as entertainment devices (e.g., a springboard, exercise ball, trampoline, dance pole, dance partner, chair, etc.) or accessories (e.g., free weights, weighted balls, hula hoops, yoga blocks, bands, etc.). In an aspect, this entertainment equipment can include a sensor device(s) configured to track and record user movements and motions and report (e.g., via wireless or wired connections) these movements and motions to the client device (and/or avatar server). For example, sensors and monitoring devices included in a treadmill can track user speed and incline. In another example, sensors included in various weight machines or free weights can detect and report number of reps, intensity, weight used, range of motion etc. Still in yet another example, a balance board or pressure sensitive mat can detect user movement performed while standing on the matt based on pressure and weight distribution.

In yet another aspect, physical and physiological activity data about a user corresponding to movement/motion and appearance of the user can be captured by the client device. For example, the client device can include a visual capture device such as a still image camera, a video camera, or a three dimensional camera/scanner configured to capture image and/or video data of the user. According to this example, the client device can collect video and still images of the user as the user performs an activity, task, or routine (e.g., a dance, gymnastic exercise, workout routine).

In another aspect, the client device can include a sensor module that can aid with detection of user motion and motion data using infrared or visible light detection devices. In yet another aspect, client device can include a wearable device and sensor module can include biometric and/or motion sensors configured to capture the various physical and physiological activity metrics described with respect to sensor devices. Client device also may include a rendering component to generate and present an avatar to the user. For example, rendering component can be configured to generate a graphical user interface that includes the avatar and rendered via a display screen of the client device. In another example, rendering component can be configured to generate an avatar as a hologram that is presented to the players. In an aspect, an avatar generated/presented via rendering component perform various visual and/or audible actions based at least in part on analysis of the physical and physiological activity data during the activity of the performer as described herein. In another aspect, an avatar generate/presented to the user via rendering component is configured to provide a visual replica of the performer.

The client device can include an avatar platform to provide for processing and analyzing of user's physical and physiological activity data to facilitate determination and manifestation of avatar reactions and appearances to the data in accordance with aspects described herein. The avatar server can further communicate control commands, determined based on the processed physical and physiological activity data, that control the various visual and/or audible actions of the avatar generated and displayed at client device by rendering component. In another aspect, various processing and analysis functions associated with avatar platform can be divided between a client device and an avatar server.

US Patent Application Publication No. 20130128022 (Bose) discloses an intelligent motion capture element that includes sensor personalities that optimize the sensor for specific movements and/or pieces of equipment and/or clothing and may be retrofitted onto existing equipment or interchanged therebetween and automatically detected for example to switch personalities. May be used for low power applications and accurate data capture for use in healthcare compliance, sporting, gaining, military, virtual reality, industrial, retail loss tracking, security, baby and elderly monitoring and other applications for example obtained from a motion capture element and relayed to a database via a mobile phone. System obtains data from motion capture elements, analyzes data and stores data in database for use in these applications and/or data mining. This enables unique displays associated with the user, such as 3D overlays onto images of the user to visually depict the captured motion data. Enables performance related equipment fitting and purchase. Includes active and passive identifier capabilities.

Embodiments of the Bose technology may couple with RFID tags or passive RFID tags directly or indirectly that are placed on items that a user moves wherein embodiments of the system keep track of the motion.

Embodiments that utilize motion capture elements allow for analyzing the data obtained from the apparatus and enable the presentation of unique displays associated with the user, such as 3D overlays onto images of the body of the user to visually depict the captured motion data. In addition, these embodiments may also utilize active wireless technology such as BLUETOOTH® Low Energy for a range of up to 50 meters to communicate with a golfer's mobile computer. Use of BLUETOOTH® Low Energy chips allows for a club to be in sleep mode for up to 3 years with a standard coin cell battery, thus reducing required maintenance. One or more embodiments of the invention may utilize more than one radio, of more than one technology for example. This allows for a level of redundancy that increases robustness of the system. For embodiments of the invention that utilize a mobile device (or more than one mobile device) without camera(s), sensor data may be utilized to generate displays of the captured motion data, while the mobile device may optionally obtain images from other cameras or other mobile devices with cameras. For example, display types that may or may not utilize images of the user may include ratings, calculated data and time line data.

Motion capture data also can be displayed in many ways, for example tweeted, to a social network during or after motion capture. For example, if a certain amount of exercise or motion is performed, or calories performed, or a new sports power factor maximum has been obtained, the system can automatically tweet the new information to a social network site so that anyone connected to the Internet may be notified. The data uploaded to the Internet, i.e., a remote database or remote server or memory remote to the system may be viewed, analyzed or data mined by any computer that may obtain access to the data.

The present technology includes a system and method for utilizing motion capture data according to this technology may include, by way of non-limiting examples: at least one motion capture element configured to couple with a user or piece of equipment wherein said at least one motion capture element comprises a memory; a sensor configured to capture any combination of values associated with an orientation, position, velocity, acceleration of said at least one motion capture element; a radio; a microcontroller coupled with said memory, said sensor and said radio wherein said microcontroller is configured to collect data that comprises sensor values from said sensor; store said data in said memory; transmit said data via said radio; an application configured to execute on a mobile device wherein said mobile device comprises a computer; a wireless communication interface configured to communicate with said radio to obtain said data, wherein said computer is coupled with wireless communication interface wherein said computer executes said application to configure said computer to receive data associated with said at least one motion capture element via said wireless communication interface; analyze said data to form motion analysis data; store said data, or said motion analysis data, or both said data and said motion analysis data associated with said user or piece of equipment; access previously stored motion capture data or motion analysis data associated with said user or piece of equipment or previously stored motion capture data or motion analysis data associated with at least one other user or other piece of equipment; display information based on said motion analysis data associated with said user or piece of equipment and said previously stored motion capture data or motion analysis data associated with said user or piece of equipment or said previously stored motion capture data or motion analysis data associated with at least one other user or other piece of equipment. The microcontroller may be further configured to alter a sampling rate of said sensor based on said sensor values obtained from said sensor to maintain accuracy of said sensor values, and the microcontroller may be further configured to detect a first value from said sensor values having a first threshold value and detect a second value from said sensor values having a second threshold value within a time window; signify a prospective event; compare said prospective event to a characteristic signal associated with a typical event and eliminate any false positive events; signify a valid event if said prospective event is not a false positive event; save said valid event in said memory comprises information within an event time window as said data.

Embodiments of the invention enable a system and method for utilizing motion capture data. Embodiments of the invention enable a user to purchase an application or "app" and a motion capture element and immediately utilize the system with their existing mobile computer, e.g., mobile phone. The system enables applications in healthcare compliance, sporting, gaming, military, fire, police, virtual reality, industrial, retail loss tracking, security, baby and elderly monitoring and other applications through use of motion capture data obtained from one or more users instrumented pieces of entertainment performers. Embodiments of the invention may display motion information to a monitoring user, or user associated with the motion capture element or piece of gaming equipment.

Embodiments of the system perform motion capture and/or display with an application for example that executes on mobile device that may include a visual display and an optional camera and which is capable of obtaining data from at least one motion capture element such as a visual marker and/or a wireless sensor. The system can also integrate with standalone cameras, or cameras on multiple mobile devices. The system also enables the user to modify and display the motion capture data through the menu at the player terminal in a variety of ways that provide immediate easy to understand graphical information associated with the motion capture data.

Embodiments of the invention may calibrate more than one sensor at a time, either while mounted on an entertainer or in a hexapod so that for example a large number of motion capture elements may be calibrated by moving one entertainer to the motion capture elements that in turn moves the motion capture elements in the number of desired axes. Other embodiments may displaying information such as music selections or music playlists to be played based on the motion related data. This for example enables a performance to be compared to another user's performance and select the type of music the other user plays, or to compare the performance relative to a threshold that determines what type of music selection to suggest or display.

The present technology also allows for incorporation of the system disclosed by Published US Patent Application Document No. 20080158232 (Shuster) which discloses a computer system that is used to host a virtual reality universe process in which multiple avatars are independently controlled in response to client input. The host provides coordinated motion information for defining coordinated movement between designated portions of multiple avatars, and an application responsive to detect conditions triggering a coordinated movement sequence between two or more avatars. During coordinated movement, user commands for controlling avatar movement may be in part used normally and in part ignored or otherwise processed to cause the involved avatars to respond in part to respective client input and in part to predefined coordinated movement information. Thus, users may be assisted with executing coordinated movement between multiple avatars. The method of managing the computer-implemented animation process for multiple participants includes: animating motion of respective ones of modeled avatars in a modeled VRU environment each independently responsive to respective ones of multiple separate command streams provided to a host computer; initiating a coordinated motion sequence at the host involving the modeled avatars; in response to initiating the coordinated motion sequence, animating coordinated motion between the modeled avatars to provide animation data, such that at least one of the multiple separate command streams controls at least two respective ones of modeled avatars that, prior to initiating the coordinated motion sequence were independently animated in response to respective ones of the multiple separate command streams; and providing animation data for display of an animated scene depicting the coordinated movement. The animating of the coordinated motion is done in part according to predefined coordinated motion information defining motion of one or more of the modeled avatars in relation to motion of a lead one of the modeled avatars.

FIG. 3 is a perspective overview of an example (from U.S. Pat. No. 8,734,260, Pececnik, incorporated herein by reference in its entirety) of an enclosed theater system 300 with seating 325, 335 for engaging in three-dimensional systems according to the present technology. The screen 310 is positioned with walk spaces 315, 340, 320, 345 and 330 distributed about the seating 325 and 335. Walls 305 enclose the theater system 300. Space between the screen 310 and a back frame/wall system 350 can be used to store apparatus (not shown) used in creating the three-dimensional gaming images used within the scope of the present technology. This gaming system provides a wagering venue for multiple wagering positions comprising: a) a processor configured to execute code to simulate a physical random gaming event outcome using a random number generator; b) memory storing three-dimensional video displayable image data of a device useful in providing the physical random gaining event outcome; c) a three-dimensional video display system having a three-dimensional image display field viewable within an at least 30 degree field of view; d) at least two player input terminals and seating for the player input terminals within the at least 30 degree field of view; wherein the processor is configured i) to identify a wager from a specific player input terminal, ii) to initiate generation of an event outcome in a random event outcome game, iii) to generate an event outcome simulating a physical random event generating outcome; iv) to select image data from the memory of a three-dimensional event outcome in which the generated simulated physical random event outcome is shown; v) to display the selected image data; and vi) to resolve the wager based upon the generated event outcome.

What is claimed is:

1. A gaming system providing player adjusted entertainment content comprising:
 a multiple number of player input terminals, each player input terminal having player input controls in communication with a gaming processor and a display screen;
 a community display system viewable from each player input terminal;
 a display processor in communication with the community display system;
 a motion capture system in communication with the display processor; and
 a controller configured to control the motion capture system, wherein the controller is in communication with each player input terminal and configured to receive input commands from the player input controls, and wherein the controller is in communication with the display processor,
 wherein the gaming processor is configured to execute instructions configured to execute wagering events, including to accept wagers from each player input terminal and to resolve wagers based upon random event outcomes determined by the gaming processor, and
 wherein the display processor is configured to cause the community display system to display the player adjusted entertainment content independent of the wagering events based on one or more of the input commands received from the player input controls and data received from the motion capture system.

2. The gaming system of claim 1, wherein a priority for the input commands received from the player input controls and the data received from the motion capture system is determined by the gaming processor.

3. The gaming system of claim 2, wherein the determination of the priority for a player input terminal among the multiple number of player input terminals is based upon one or more of a weighting of time of a player at the player input terminal, a total amount of wagering at the player input terminal, and a total amount of losses incurred at the player input terminal.

4. The system of claim 1, wherein each player input terminal is configured to display on the display screen available commands for communication to the display processor by the player input controls as the input commands.

5. The system of claim 4, wherein the available commands include one or more of musical selections and styles of movement to be performed by a performer associated with the motion capture system.

6. The system of claim 1, wherein the motion capture system is in wireless communication with the display processor at a communication rate of at least 60 Hertz.

7. A gaming system providing player adjusted entertainment content comprising:
 a multiple number of player input terminals, each play input terminal having player input controls in communication with a gaming processor and a display screen;
 a community display system viewable from each player input terminal;
 a display processor in communication with the community display system;
 a library of pre-recorded motion images of a performer, the library in communication with the display processor; and
 a controller configured to control the library, wherein the controller is in communication with each player input terminal and configured to receive input commands from the player input controls, and wherein the controller is in communication with the display processor,
 wherein the gaming processor is configured to execute instructions configured to execute wagering events, including to accept wagers from each player input terminal and to resolve wagers based upon random event outcomes determined by the gaming processor, and
 wherein the display processor is configured to cause the community display system to display the player adjusted entertainment content independent of the wagering events based on one or more of the input commands received from the player input controls and specific performances in the library.

8. The gaming system of claim 7, wherein the gaming processor is further configured to execute instructions configured to simulate a physical random gaming event outcome using a random number generator; wherein the library includes memory storing three-dimensional video displayable image data of an entertainment activity; wherein the community display system includes a three-dimensional video display system having a three-dimensional image display field viewable within an at least 30 degree field of view; wherein at least two player input terminals among the multiple number of player input terminals and seating for the at least two player input terminals are within the at least 30 degree field of view; and wherein the gaming processor is configured:
 i) to identify a wager from a specific player input terminal,
 ii) to initiate generation of an event outcome in a random event outcome game,
 iii) to generate the event outcome simulating a physical random event generating outcome;
 iv) to cause the controller to select image data from the memory of a three-dimensional entertainment event based upon command from a player input terminal;
 v) to cause the display processor to display the selected image data on the community display system; and
 vi) to resolve the wager based upon the generated event outcome.

9. The gaming system of claim 1, wherein the gaming processor is further configured to execute instructions to communicate with a wagering venue to execute the wagering events, the wagering venue comprising:
 a) a processor configured to execute code to simulate a physical random gaming event outcome using a random number generator; and
 b) at least temporary memory storing three-dimensional video displayable image data from the motion-capture system;
 c) wherein the community display system is a three-dimensional video display system having a three-dimensional image display field viewable within an at least 30 degree field of view;
 d) wherein at least two player input terminals and seating for the at least two player input terminals are within the at least 30 degree field of view;
 e) wherein the processor is configured:

i) to identify a wager from a specific player input terminal, ii) to initiate generation of an event outcome in a random event outcome game, iii) to generate the event outcome simulating a physical random event generating outcome;

iv) to select image data from the at least temporary memory;

v) to cause the display processor to display the selected image data on the three-dimensional video display system; and vi) to resolve the wager based upon the generated event outcome.

10. A method of providing entertainment on a gaming system and providing player adjusted entertainment content, comprising:

processing wagering events, including receiving wagers from one or more player input terminals and resolving the wagers based on random event outcomes determined by one or more gaming processors of the one or more player input terminals;

receiving input commands from the one or more player input terminals, the input commands at least providing operating instructions for a motion capture system in communication with a display processor;

displaying player adjusted entertainment content on a community display system visible from the player input terminals independent of the wagering events based on the input commands received from the one or more player input terminals at the display processor and data received from the motion capture system at the display processor.

11. The method of claim 10, wherein a priority for the input commends received from the one or more player input controls at the display processor and the data received from the motion capture system at the display processor is determined by the one or more gaming processors.

12. The gaming system of claim 11, wherein the determination of the priority is performed by the one or more gaming processors executing instructions based upon one or more of a weighting of time of a player at a player input terminal among the one or more player input terminals, a total amount of wagering at the player input terminal, and a total amount of losses incurred at the player input terminal.

13. The method of claim 12, wherein the player input terminals provide to the player available input commands for communication to the display processor.

14. The method of claim 13, wherein the available input commands include one or more of a musical selection and styles of movement selection to a performer associated with the motion capture system.

15. The method of claim 10, wherein the motion capture system communicates in wireless communication with the display processor at a communication rate of at least 60 Hertz.

16. The method of claim 11, wherein the motion capture system communicates in wireless communication with the display processor at a communication rate of at least 70 Hertz.

17. The method of claim 12, wherein the motion capture system communicates in wireless communication with the display processor at a communication rate of at least 90 Hertz.

* * * * *